US011005814B2

(12) United States Patent
Curcio et al.

(10) Patent No.: US 11,005,814 B2
(45) Date of Patent: May 11, 2021

(54) NETWORK SECURITY

(71) Applicant: HEWLETT PACKARD ENTERPRISE DEVELOPMENT LP, Houston, TX (US)

(72) Inventors: Joseph A. Curcio, Roseville, CA (US); Jechun Chiu, Austin, TX (US); Bruce E. Lavigne, Roseville, CA (US); Wei Lu, Austin, TX (US); Shaun Wakumoto, Roseville, CA (US); Mauricio Sanchez, San Francisco, CA (US); Matthew Laswell, Austin, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 40 days.

(21) Appl. No.: 15/316,688

(22) PCT Filed: Jun. 10, 2014

(86) PCT No.: PCT/US2014/041751
§ 371 (c)(1),
(2) Date: Dec. 6, 2016

(87) PCT Pub. No.: WO2015/191052
PCT Pub. Date: Dec. 17, 2015

(65) Prior Publication Data
US 2017/0142071 A1    May 18, 2017

(51) Int. Cl.
*H04L 29/06* (2006.01)
*H04L 29/08* (2006.01)
(Continued)

(52) U.S. Cl.
CPC ...... *H04L 63/0263* (2013.01); *H04L 12/6418* (2013.01); *H04L 43/50* (2013.01);
(Continued)

(58) Field of Classification Search
CPC ............... H04L 63/0263; H04L 63/205; H04L 63/1408; H04L 12/6418; H04L 63/0254;
(Continued)

(56) References Cited

U.S. PATENT DOCUMENTS 7,023,861 B2 * 4/2006 Makinson ........... H04L 63/0209
370/401
2006/0221956 A1 * 10/2006 Narayan ................. H04L 45/54
370/389
(Continued)

FOREIGN PATENT DOCUMENTS

WO    WO-2014/046875 A1    3/2014

OTHER PUBLICATIONS

Dolev et al., "Trawling Traffic under Attack, Overcoming DDoS Attacks by Target-Controlled Traffic Filtering," 2009 International Conference on Parallel and Distributed Computing, Applications and Technologies Year: 2009 | Conference Paper | Publisher: IEEE.*
(Continued)

*Primary Examiner* — Roderick Tolentino
(74) *Attorney, Agent, or Firm* — International IP Law Group, PLLC

(57) ABSTRACT

An example of a computing system is described herein. The computing system includes a plurality of network security devices. The computing system also includes a network switch configured to direct network traffic. The computing system further includes a controller coupled to the network switch. The controller is to instruct the network switch in directing network traffic to the plurality of network security devices.

15 Claims, 5 Drawing Sheets

(51) Int. Cl.
*H04L 12/64* (2006.01)
*H04L 12/26* (2006.01)

(52) U.S. Cl.
CPC ...... *H04L 63/0254* (2013.01); *H04L 63/0281* (2013.01); *H04L 63/1408* (2013.01); *H04L 63/20* (2013.01); *H04L 63/205* (2013.01); *H04L 67/1002* (2013.01)

(58) Field of Classification Search
CPC .. H04L 63/0281; H04L 63/20; H04L 67/1002
USPC .................................................. 726/22–25
See application file for complete search history.

(56) References Cited

U.S. PATENT DOCUMENTS

| | | | |
|---|---|---|---|
| 2007/0011740 A1* | 1/2007 | Davis | H04L 63/0227 726/22 |
| 2007/0140122 A1* | 6/2007 | Murthy | H04L 69/12 370/231 |
| 2010/0037321 A1 | 2/2010 | Oz et al. | |
| 2010/0054241 A1* | 3/2010 | Shah | H04L 45/30 370/389 |
| 2012/0216273 A1 | 3/2012 | Rolette et al. | |
| 2012/0204219 A1 | 8/2012 | Kopti | |
| 2013/0124851 A1 | 5/2013 | Kain | |
| 2013/0223442 A1 | 8/2013 | Narayanan et al. | |
| 2013/0291088 A1 | 10/2013 | Shieh et al. | |
| 2013/0333029 A1* | 12/2013 | Chesla | H04L 67/327 726/22 |
| 2014/0052836 A1 | 2/2014 | Nguyen et al. | |
| 2014/0105039 A1 | 4/2014 | McDysan et al. | |
| 2014/0143854 A1 | 5/2014 | Lopez et al. | |
| 2014/0162629 A1* | 6/2014 | Tipton | H04W 36/26 455/423 |
| 2014/0283030 A1* | 9/2014 | Moore | H04L 63/0263 726/22 |
| 2015/0131663 A1* | 5/2015 | Brar | H04L 45/745 370/392 |
| 2015/0271193 A1* | 9/2015 | Estes | H04L 63/1416 726/23 |

OTHER PUBLICATIONS

Duan et al., "Traffic-aware dynamic firewall policy management: techniques and applications," Year: 2013 | vol. 51, Issue: 7 | Magazine Article | Publisher: IEEE.*

International Search Report and Written Opinion, International Application No. PCT/US2014/041751, date Feb. 16, 2015, pp. 1-11, KIPO.

Lee Doyle, "Where SDN and Dpi Technology Meet: Centralized Control and Automation" Jun. 24, 2014, pp. 1-4, TechTarget, Available at: <searchsdn.techtarget.com/tip/Where-SDN-and-DPI-technology-meet-Centralized-control-and-automation >.

* cited by examiner

200

500

NETWORK SECURITY

BACKGROUND

A network can include a variety of devices that transfer data throughout the network. This data is typically contained within packets that are transferred by switches, routers, or other network devices. Often times, these data packets can include viruses or other malicious code.

BRIEF DESCRIPTION OF THE DRAWINGS

Certain examples are described in the following detailed description and in reference to the drawings, in which.

DETAILED DESCRIPTION OF SPECIFIC EMBODIMENTS

The present disclosure provides techniques for securing a network against malicious activity. The trend in network malicious code and intrusion payload transmission is rising with network proliferation. This rise in malicious code and intrusion payload transmission has spawned an industry that produces security products that utilize packet inspection technologies, such as deep packet inspection. Examples of deep packet inspection (DPI) can include intrusion detection systems (IDS), intrusion prevention systems (IPS), and next generation firewalls (NGFW), among others. Traditional DPI deployments can be fixed "bump-in-the-wire" dedicated middle boxes. Bump-in-the-wire refers to a network security device that is inserted at a specific point in the network between two dedicated device ports, and can only inspect traffic flowing between these two dedicated device ports. Accordingly, these bump-in-the-wire deployments provide network defense that is limited in scale by fixed "port segments". Port segments are pairs of network connections to connect a device to a network. Physical segments are often oversized and underutilized. In order to overcome these limitations, multiple DPI devices can be purchased and distributed across the network to provide predetermined protection of specific physical links and topologies. However, the network is rendered unprotected while the DPI devices are redeployed to different segments of the network. In addition, the per-port cost for these DPI devices is typically high. This high cost has been prohibitive in distributing multiple high-performance DPI devices below distribution switches in a network.

However, by employing a controller to monitor and control network traffic to network security devices in the network, the network security devices can act as a programmable service for multiple switches in the network. Network security devices are devices that scan packets to detect malicious activity and/or content in the network traffic. For example, network security devices can include deep packet inspection (DPI) technologies. In addition, by monitoring and controlling network traffic from the network switches to the network security devices, the workload of the network security devices can be customized to the network security devices' capabilities and use of network security device bandwidth can be optimized. In addition, by including a pool of network security devices including a plurality of network security devices accessible by all of the components of a network, a larger pool of network security resources can be extended to the components of the network.

Figure 1:
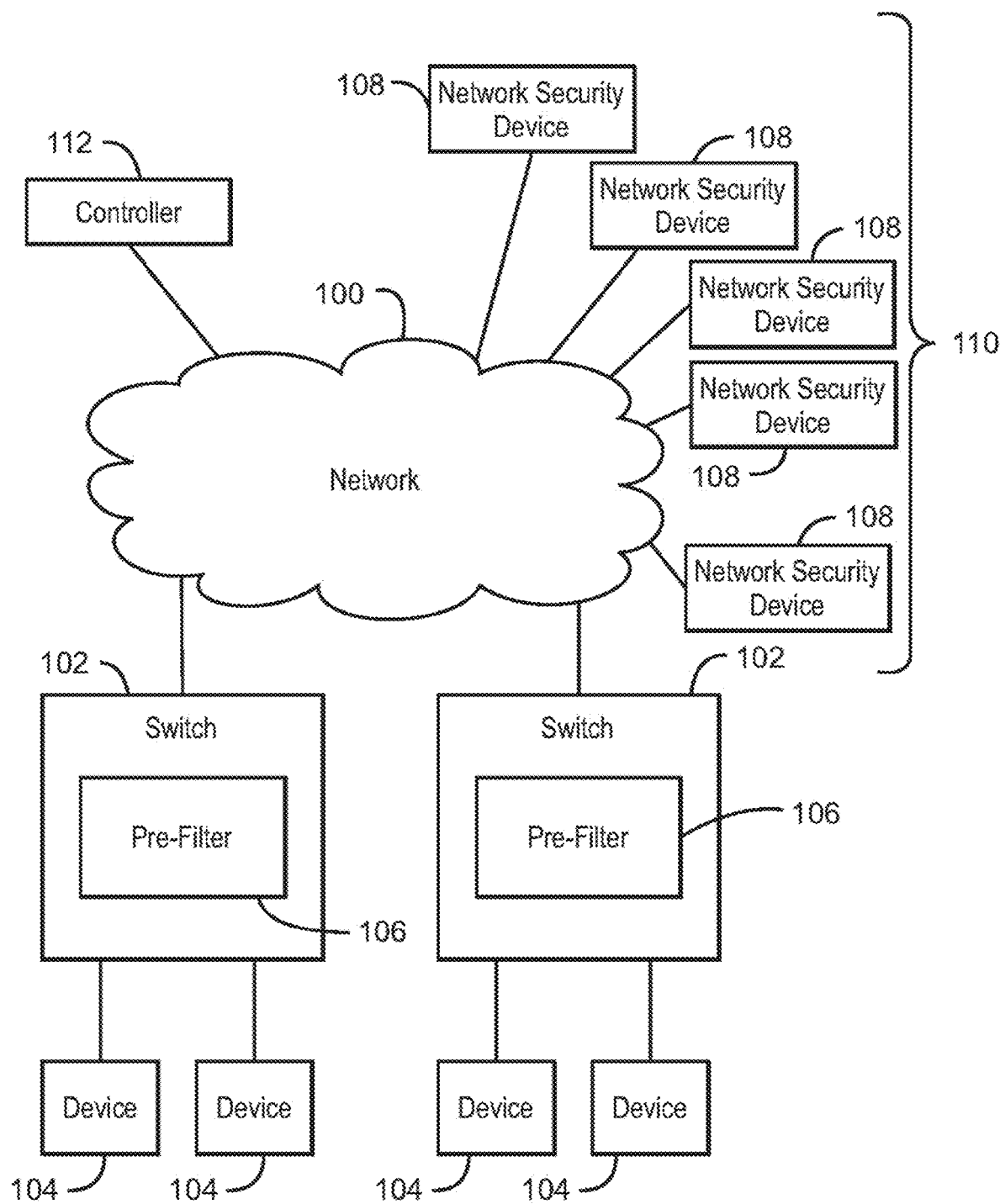
FIG. 1 is a block diagram of an example of a network.

FIG. 1 is a block diagram of an example of a computing system. In an example, the computing system can be a network 100. The network 100 includes a switch 102. In an example, the network can include a plurality of switches 102. The switches 102 receive incoming network traffic (data) and perform packet switching to process and forward the network traffic in the form of packets. The packets can be directed to devices coupled to the network 100. Each switch 102 can include a plurality of devices 104 coupled to the switch. The switch 102 can transfer network traffic to and from these devices 104. The devices 104 can include any suitable type of computing device, such as a memory device, a computer, a client device, a printing device, a wireless Access Point (AP), or any other suitable type of device. Each switch can further include a pre-filter 106. The pre-filter 106 can scan the network traffic, such as a portion of the network traffic, Network traffic found to potentially include malware can be identified and addressed. For example, the pre-filter 106 can scan the network traffic to determine if malicious activity and/or content is potentially present in the network traffic. In another example, the pre-filter 106 can identify malicious activity/content in the network traffic. Suspicious network traffic can be directed for deeper scanning.

The network 100 can also include a plurality of network security devices 108 to perform packet inspection to identify malicious activity. Network security devices are devices that scan packets to detect malicious activity in the network traffic. For example, network security devices can include deep packet inspection (DPI) technologies. In an example, network security devices 108 can be discrete devices in the network 100. In another example, a network security device 108 can be included in a switch 102 of the network 100. The plurality of network security devices 108 forms a pool 110 of network security devices 108. The pool 110 of network security devices can be accessed by each of the switches 102 in the network 100. Network traffic, such as a predetermined portion of the network traffic can be directed from the switches 102 to the network security devices 108. The portion of the network traffic can be selected in a variety of ways, which will be addressed below. The network security devices 108 scan the network data to determine if malware is present in the network traffic. In an example, a single network security device 108 can be selected from the pool 110 of network security devices to scan a portion of the network traffic. In another example, multiple network security devices 108 can be selected from the pool 110 of network security devices to scan the portion of the network traffic.

Multiple network security devices 108 can be used in different configurations. In an example, each of a plurality of network security devices 108 can perform a portion of packet inspection. The selected network traffic can be processed by at least one of the multiple network security devices 108. A further portion of the network traffic can be identified for additional scanning after being processed by a threshold number of network security devices 108. In such a configuration, each successive level of packet inspection processes fewer packets.

In another example, each of the plurality of network security devices 108 can perform complete packet inspection on a portion of the selected network traffic. The switch 102 can divert a different portion of the selected network traffic to each of the network security devices 108. In such a configuration, packet inspection is performed by multiple network security devices 108, which can increase processing throughput. In another example, multiple network security devices 108 can implement multiple levels of packet inspection, with each level including multiple network security devices 108 (e.g., a combination of the above-described configurations). In a further example, each of the network security devices 108 includes a unique scanning focus. The switch 102 can identify network traffic including malicious activity/content and, based on the policy, direct the identified network traffic to the network security device 108 including a scanning focus that matches the identified malicious activity/content. For example, each pre-filter of the switch 102 can be aligned to a network security device 108 with a specific property. When the pre-filter of the switch 102 identifies malicious activity/content matching that specific property, the network traffic is directed to the network security device 108.

The network 100 further includes a controller 112. In an example, the controller 110 is a discrete device. In another example, the controller 110 is included in the switch 102. The controller 112 can be any suitable type of controller, such as a software-defined network (SDN) controller. The controller 112 monitors and controls processing and transport of traffic in the network. The controller 112 monitors the capabilities of the devices of the network 100 and the network traffic and, based on this information, creates policies to determine the destination of network traffic. For example, the controller 112 monitors the capabilities of and network traffic to the network security devices 108. Based on this information, the controller 112 creates a policy to determine which portion of network traffic to divert to the network security devices 108 for scanning. The policy also determines to which network security device 108 of the pool 110 of network security devices the network traffic is diverted. The network security device 108 can be selected by determining which network security device's 108 capabilities and workload matches the characteristics and/or additional scanning properties of the network traffic to be diverted. For example, the controller 112 selects a network security device 108 from the pool 110 of network security devices based on packet criteria matches such as VLAN ID, the client (e.g., the MAC or IP source address), who the client is communicating with (e.g., the MAC or IP destination address), the client port or uplinks, or the application, among others, or some combination of these. Network security device selection can be further optimized by pre-filtering the selected network traffic in the pre-filter 106 of the switch 102. In another example, the policy can instruct the switch to split the network traffic between multiple network security devices 108 within the pool 110 of network security devices. This policy is transmitted from the controller 112 to the switches 102 and the switches 102 divert the selected portion of the network traffic to the network security device 108 based on the policy.

The portion of network traffic to divert to the pool of network security devices 110 for scanning can be determined in a number of ways. For example, in the event that a new network connection is established with a new device, the network can notify the controller of the new network connection. The new device can be any suitable device, such as a client, a mobile, device, or a personal computer (PC), among others. The new device may be connected to the network via a switch 102. The controller can create a policy including instructions directing the switch 102 to divert network traffic from the new network connection to the network security device 108 for a calculated period of time. This period of time can be set by the policy or calculated by an algorithm. In addition, this period of time can differ between network connections. For example, network traffic from the new network connection can be scanned for a longer period of time than network traffic from an authenticated network connection. In another example, network traffic from a new user or a guest user can be scanned for a longer period of time than network traffic from an authenticated user.

In another example, the policy can include instructions directing the switch 102 to divert a calculated amount of network traffic from the new network connection to the network security device 108. This amount of network traffic can be set by the policy or calculated by an algorithm. In addition, this amount of network traffic to be scanned can differ between network connections. For example, a larger amount of network traffic from the new network connection can be scanned than the amount of network traffic from an authenticated network connection. In another example, a larger amount of network traffic from a new user or a guest user can be scanned than the amount of network traffic from an authenticated user. The controller can direct the network security device(s) 108 to scan the new network connection until the network connection is determined to be clean or free of malicious activity/content. Network traffic from the new connection can be prioritized in the network security device(s) 108 over network traffic from a previously established connection(s). When the network traffic from the new network connection is determined to be free of security hazards, the network security device(s) 108 can return to scanning network traffic from the previously established connection(s).

In a further example, the policy can include instructions directing the switch 102 to select a calculated amount of network traffic to divert to the network security device 108. The instructions can direct the switch 102 to randomly select the calculated amount of network traffic. For example, the policy can direct the switch 102 to make the selection at preselected time intervals or when a certain amount of time has passed (timeslicing). In another example, a combination of these methods, or any other suitable method, can be employed in order to increase the chances of detecting a security risk in the network traffic while not overwhelming each network security device 108.

The controller 112 can dynamically reconfigure the policy based upon the state of the network. For example, upon being notified of a new network connection, the controller 112 can reconfigure the policy to instruct the switch 102 to prioritize scanning of network traffic from the new network connection. When the network traffic from the new network connection has been scanned, the controller 112 can reconfigure the policy to instruct the switch 102 to return to processing network traffic from previously established network connections. In addition, the controller 112 can scale availability of the network security devices 108 by scaling and rotating network traffic into the network security devices 108 to scan the entire network 100 over time. Further, the controller 112 can reconfigure the policy to maximize the resources of the network security devices 108. For example, when the controller 112 determines that a particular policy has overloaded a network security device 108, the controller 112 can change the policy to reduce the workload of the network security device 108.

In an example, the switch can pre-filter the network traffic to select the portion of network traffic to be diverted to the pool 110 of network security devices for scanning. Suspicious network traffic can be directed to the pool 110 of network security devices for more intensive scanning. Further, because the controller 112 monitors the capabilities and workload of the components of the network 100, including the pool 110 of network security devices, the controller 112 can dynamically reconfigure the policy in order to optimize the capabilities (e.g., the bandwidth) of the pool 110 of network security devices 110 and to prevent the pool 110 of network security devices from being overloaded.

The selected network security device(s) 108 scans the selected portion of the network traffic and notifies the controller 112 and/or the switch 102 from which the infected network traffic originated. The controller 112 determines what action to take to address the infected network traffic and instructs the switch 102 to carry out the determined action.

It is to be understood the block diagram of FIG. 1 is not intended to indicate that the computing system 100 is to include all of the components shown in FIG. 1 in every case. Further, any number of additional components can be included within the computing system 100, depending on the details of the specific implementation.

Figure 2:
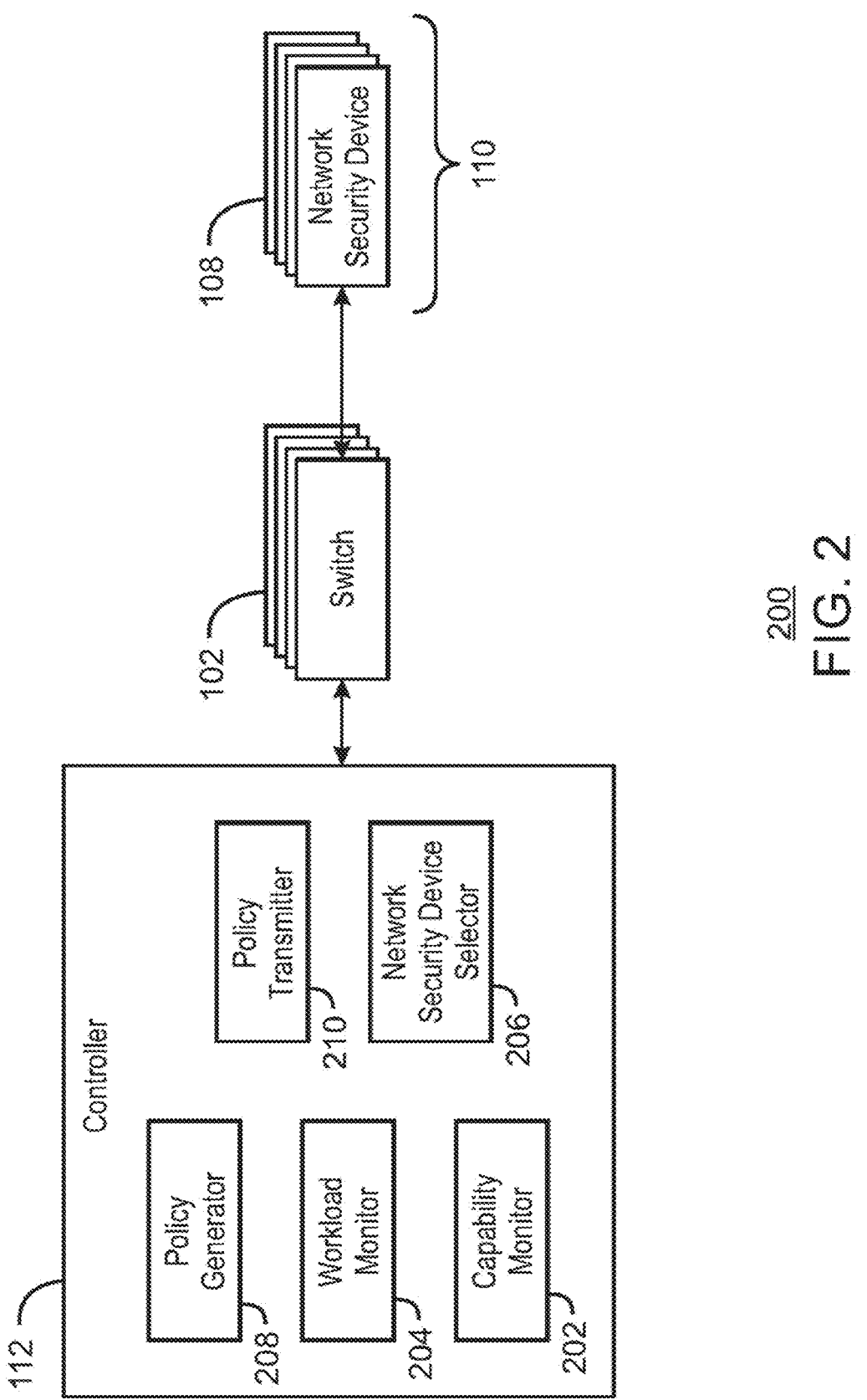
FIG. 2 is a block diagram of an example of a controller.

FIG. 2 is a block diagram of an example of a controller 12. The controller 112 includes a capability monitor 202. The capability monitor 202 monitors the capabilities of each device in the network 100. For example, the capability monitor 202 monitors the capabilities of each network security device 108 or the plurality of network security devices 110. These capabilities include bandwidth, throughput, latency, supported protocols, supported functionalities, supported DPI technologies, supported policies, flow entries, and sets of signatures, among others. The capabilities of each network security device 108 is registered with the controller 112 upon addition of the network security device 108 to the network 100 and the controller 112 continues to monitor the network security devices 108 to determine any changes in the registered capabilities.

The controller 112 also includes a workload monitor 204. The workload monitor 204 continually monitors the workload of each network security device 108 of the plurality of network security devices 110. The workload of each network security device 108 is determined by the amount of network traffic that is currently directed to the network security device 108 and the amount of bandwidth to be used in scanning the network traffic directed to the network security device 108. In addition, the workload monitor 204 can monitor the network traffic in a network switch 102 or a plurality of network switches 102. Further, the network monitor 204 can monitor the network pipes leading to the network security device(s) in order to monitor and control the network traffic path used from the switch 102 to the network security device 108.

The controller 112 further includes a network security device selector 206. In an example, the network security device selector 206 can be a policy sent to the switch 102 for dynamic forwarding decisions. The network security device selector 206 selects a network security device 108 from the plurality of network security devices 110 to receive network traffic for scanning. The network security device 108 can be selected based upon the workload and the capabilities. In an example, the network security device selector 206 can select a single network security device 108 to scan the network traffic. In another example, the network security device selector 206 can select multiple network security devices 108 of the plurality of network security devices 110 to scan the network traffic. Each network security device 108 can be selected to receive network traffic from each of the network switches 102 in the network. Accordingly, network security resources are available to each of the network switches 102 in the network. The network security device selector 206 can select the network security device(s) to receive the network traffic such that the workload of the network is distributed across the plurality of network security devices 110 and no one network security device 108 is overloaded.

The controller 112 additionally includes a policy generator 208. The policy generator 208 creates a policy that instructs a network switch 102 in directing network traffic. The policy includes instructions on selecting a portion of network traffic to divert to a network security device 108.

For network traffic not selected for scanning by a network security device 108, the network switch 102 can direct the network traffic according to a standard policy or other policy defined by the administrator, directing the network traffic to the original destination. However, for network traffic selected for scanning by a network security device 108, the policy instructs the network switch 102 in directing the network traffic to the selected network security device 108. The policy states what traffic to direct to the selected network security device. The policy further states to which network security device 108 of the plurality of network security devices 110 the portion of network traffic is directed. In another example, the policy can instruct the network switch 102 to split the network traffic between multiple network security devices 108. The policy can include instructions on how the network traffic is to be divided between the selected multiple network security devices 108. The policy can be modified over time in order to provide broad coverage of the network given the limited resources of the network security device 108.

In addition, when the selected network security device(s) 108 detects a security risk upon scanning the network traffic, the network security device 108 can notify the controller 112. The policy generator 208 can update the policy or create a new policy to address the identified security risk. The security risk can be addressed in any suitable manner including blocking, re-directing, mirroring, metering, counting, quarantining, and/or like type of alternative processing of the network traffic including the security risk, or any combination thereof. Because the controller 112 monitors the network traffic and the workload, the controller is able to identify precisely who (e.g., from which client or device) the network traffic including the security risk originates. Further, the controller 112 can also determine the exact nature of the infected network traffic and the timing and history of the infection of the network traffic. In an example, the controller 112 can quarantine the client/device from which the infection occurred from the rest of the network until the infection is addressed. In a further example, the controller 112 can quarantine the client/device to which the infection may have been transmitted. The degree of response to an infection can depend on the level of risk of the infection. For example, a low-level risk violation may result in metering, while a high-level risk may result in immediate blocking. In another example, a device or traffic flow that includes frequent violations can be quarantined until the identified security threat has been addressed. Further, the controller 112 can issue exact alerts about the infected network traffic.

The controller 112 further includes a policy transmitter 210. The policy transmitter 210 transmits the policy created by the policy generator 208 to a network switch 102 and/or to a network security device 108. Upon receiving the policy, the network switch 102 acts upon the instructions of the policy. The network security device 108 receives the policy in order to understand how to process the network traffic diverted to the network security device 108.

It is to be understood the block diagram of FIG. 2 is not intended to indicate that the controller 112 is to include all of the components shown in FIG. 2 in every case. Further, any number of additional components can be included within the controller 112, depending on the details of the specific implementation.

Figure 3:
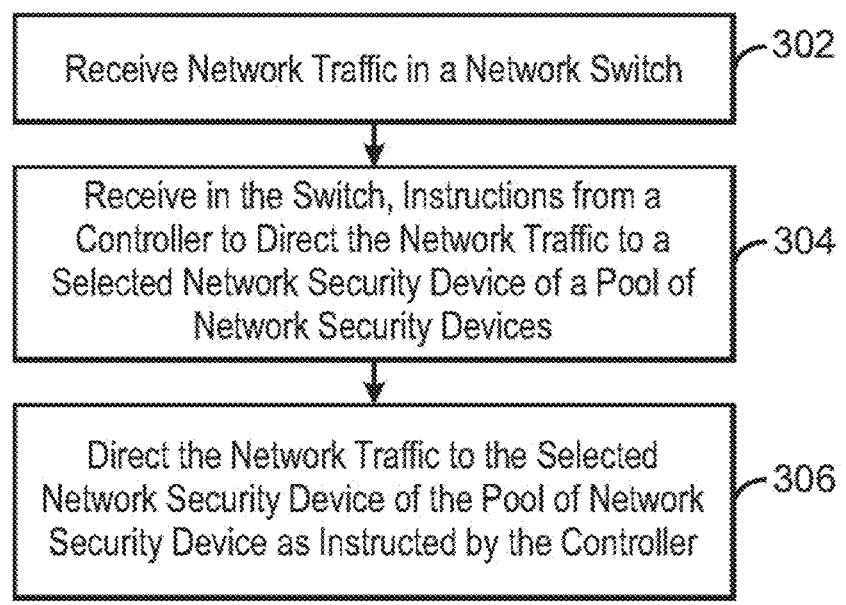
FIG. 3 is a process flow diagram of an example of a method of directing network traffic.

FIG. 3 is a process network traffic diagram of an example of a method 300 of directing network traffic. For example, the method 300 can be executed by the network switch described with respect to FIG. 2.

At block 302, network traffic can be received in a network switch. The network traffic can be received in the form of packets. These packets can be processed in preparation for being directed by the network switch. The packets can be addressed to a device coupled to the network switch, or the packets can be received from a device coupled to the network switch.

At block 304, instructions to direct the network traffic can be received in the switch from a controller. The instructions are to direct the network traffic to a selected network security device of a pool of network security devices. The network security device is selected by the controller. The controller can select the network security devices by determining which network security device's capabilities and workload are more suitable for processing the network traffic. In another example, the network security device can be selected by use of an algorithm. In a further example, the controller can determine that a combination of network security devices in the pool of network security devices is more suitable for processing the network traffic. The controller can instruct the switch to direct the network traffic to the selected combination of network security devices. By selecting the network security device(s) from the pool of network security devices based on the workload and network security device capabilities, the controller can share the workload among the pool of network security devices so that none of the network security devices in the pool of network security devices are overloaded. Further, each of the network security devices in the pool of network security devices can be accessed by each of the switches in the network, so the pool of network security resources is available to the plurality of switches.

The instructions are received in the form of a policy. The policy is created by the controller based on the capabilities and workload as determined by the controller. The controller monitors the devices of the network in order to create policies for directing the network traffic.

At block 306, the network traffic is directed by the network switch to the selected network security device(s) as instructed by the controller. For example, the policy can instruct the switch to select a portion of the network traffic to divert to a network security device for scanning. The policy can instruct the switch to make the selection in a variety of ways. For example, the policy can instruct the switch to divert network traffic from a new network connection to the network security device for a predetermined period of time. In another example, the policy can direct the switch to divert a predetermined amount of network traffic from a new network connection to the network security device. In another example, the policy can direct the switch to divert a portion of traffic to a network security device with specific capabilities and another portion of traffic to another network security device with different capabilities. Alternatively, the policy can direct the switch to randomly select a predetermined amount of network traffic to the network security device or devices. For example, the policy can make the selection at preselected time intervals, or when a certain amount of time has passed. In another example, a combination of these methods, or any other suitable method, can be employed in order to increase the chances of finding a security risk, such as malware, in the network traffic. The controller can create the policy such that the capabilities (e.g., the bandwidth) of the network security device are optimized.

It is to be understood that the process flow diagram of FIG. 3 is not intended to indicate that the elements of the method 300 are to be executed in any particular order, or that all of the elements of the method 300 are to be included in every case. Further, any number of additional elements not shown in FIG. 3 can be included within the method 300, depending on the details of the specific implementation.

Figure 4:
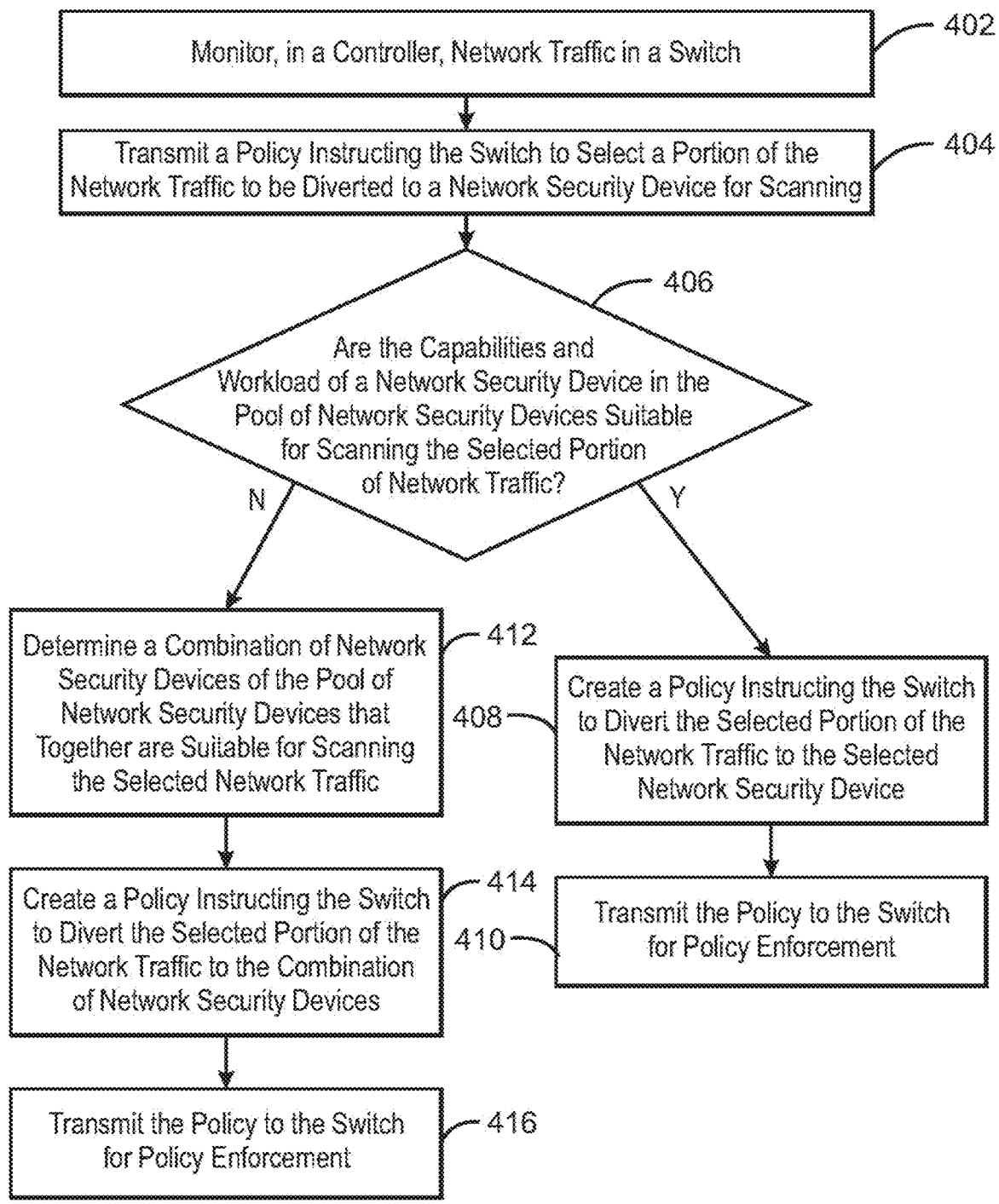
FIG. 4 is a process flow diagram of an example of a method of selecting a network security device.

FIG. 4 is a process flow diagram of an example of a method of selecting a network security device. The network security device is selected from a plurality of network security devices. For example, the method 400 can be executed by the network device described with respect to FIG. 2.

At block 402, the network traffic in a switch is monitored in a controller. The controller can determine the amount of resources to be used in scanning the network traffic for security risks. At block 404, a policy instructing the switch to select a portion of the network traffic to be diverted to a network security device for scanning is transmitted from the controller to the switch. The portion of the network traffic can be selected by any suitable means. For example, the policy can instruct the switch to divert network traffic from a new network connection to the network security device for a predetermined period of time. In another example, the policy can direct the switch to divert a predetermined amount of network traffic from a new network connection to the network security device. Alternatively, the policy can direct the switch to randomly select a predetermined amount of network traffic to the network security device. For example, the policy can make the selection at preselected time intervals, or when a certain amount of time has passed. In another example, a combination of these methods, or any other suitable method, can be employed in order to increase the chances of finding malware in the network traffic. In an example, the switch can pre-filter the network traffic to select the portion of network traffic to be diverted to a network security device for scanning. For example, a switch may have a pre-filter function that is "paired" with a particular network security device, such that suspicious network traffic is directed to the particular network security device. In another example, the switch may have multiple pre-filter capabilities that match multiple destination network security devices. Suspicious network traffic can be directed to the network security device(s) for more intensive scanning. The controller monitors the devices of the network in order to create policies for directing network traffic. The policy is a set of instructions to direct the network traffic as determined by the controller.

At block 406, the controller can determine if the capabilities and workload of a network security device in the pool of network security devices is suitable for scanning the selected portion of network traffic. If a suitable network security device is present in the pool of network security devices, at block 408, the controller creates a policy instructing the switch to divert the selected portion of the network traffic to the selected network security device. The policy is created by the controller based on the capabilities and traffic network traffic as determined by the controller. The controller can create the policy such that the capabilities (e.g., the bandwidth) of the network security device are optimized. At block 410, the policy is transmitted to the switch for policy enforcement.

If a suitable network security device is not present in the pool of network security devices, at block 412 the controller determines a combination of network security devices of the pool of network security devices that together are more suitable for scanning the selected network traffic. At block 414, the controller creates a policy instructing the switch to divert the selected portion of the network traffic to the combination of network security devices. The policy further instructs the switch in how to split the selected portion of the network traffic between the selected network security devices, and/or the order in which the network security devices 108 will process the traffic. At block 416, the policy is transmitted to the switch for policy enforcement.

It is to be understood that the process flow diagram of FIG. 4 is not intended to indicate that the elements of the method 400 are to be executed in any particular order, or that all of the elements of the method 400 are to be included in every case. Further, any number of additional elements not shown in FIG. 4 can be included within the method 400, depending on the details of the specific implementation.

Figure 5:
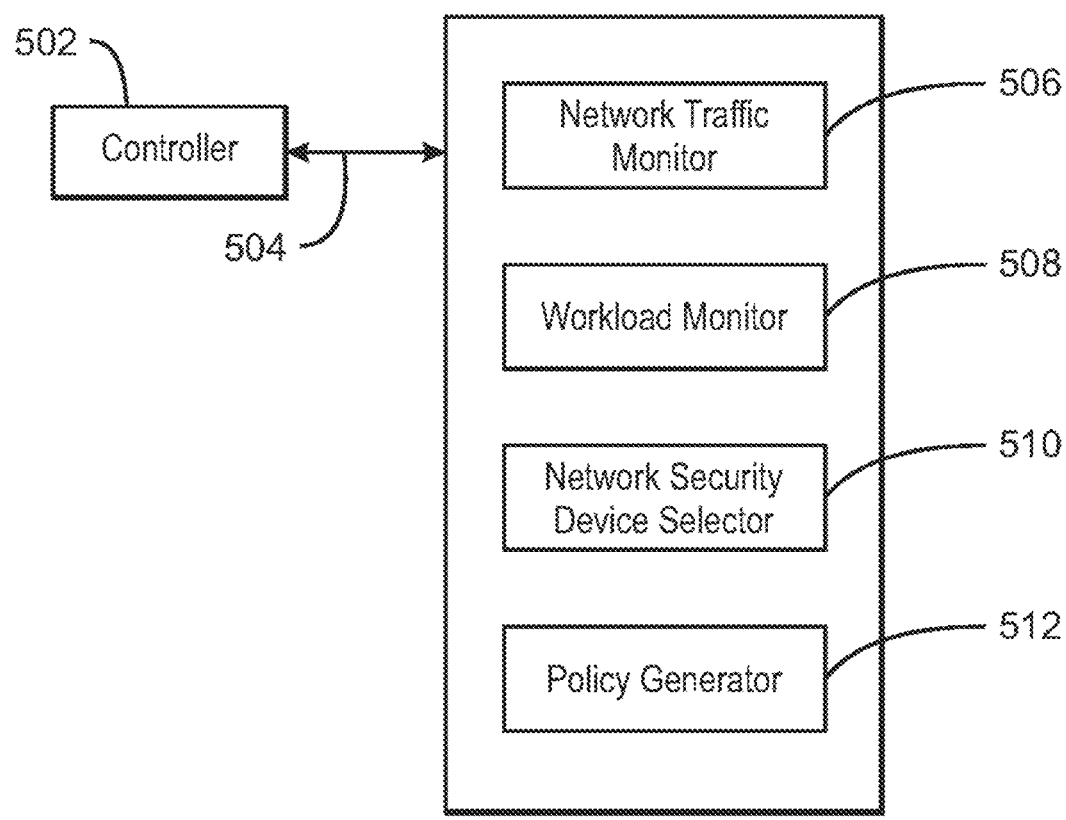
FIG. 5 is a block diagram of an example of a tangible, non-transitory, computer-readable medium that stores code configured to operate a node of a system with network security.

FIG. 5 is a block diagram of an example of a tangible, non-transitory, computer-readable medium that stores code configured to operate a node of a system with network security. The computer-readable medium is referred to by the reference number 500. The computer-readable medium 500 can include RAM, a hard disk drive, an array of hard disk drives, an optical drive, an array of optical drives, a non-volatile memory, a flash drive, a digital versatile disk (DVD), or a compact disk (CD), among others. The computer-readable medium 500 can be accessed by a controller 502 over a computer bus 504. For example, the computer-readable medium 500 can be accessed by a controller such as controller 112 illustrated in FIG. 1 and FIG. 2. Furthermore, the computer-readable medium 500 may include code configured to perform the methods described herein.

The various software components discussed herein may be stored on the computer-readable medium 500. In a computing system such as the one shown in FIG. 1, each of the components will be running on the controller 112. A region 506 can include network traffic monitor to monitor and characterize network traffic through a network switch. A region 508 can include a workload monitor to monitor network traffic diverted to each network security device of the network. A region 510 can include a network security device selector to select a network security device from a plurality of network security devices to receive network traffic for scanning. The network security device can be selected based on the characteristics of the network traffic and the workload of each network security device. A region 512 can include a policy generator to generate a policy to instruct a network switch in directing network traffic to the selected network security device(s). The generated policy is transmitted to a network switch for enforcement.

Although shown as contiguous blocks, the software components can be stored in any order or configuration. For example, if the tangible, non-transitory, computer-readable medium is a hard drive, the software components can be stored in non-contiguous, or even overlapping, sectors.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A computing system, comprising:
   a plurality of network security devices, each network security device being a device to scan packets or portions thereof directed to the network security device by a network switch to detect malicious activity in network traffic;
   the network switch configured to direct network traffic; and
   a controller coupled to the network switch, wherein the controller is to monitor differing capabilities of each network security device of the plurality of network security devices and to create at least one policy that determines a destination of the network traffic or a portion thereof based on the differing capabilities, the controller to instruct the network switch in directing network traffic to the plurality of network security devices by:
      creating a first policy to divert a first portion of the network traffic to a first network security device selected by pre-filtering the network traffic based on network traffic-related characteristics of the packets that match capabilities of the first network security device, wherein the first policy instructs the network switch to split the first portion of the network traffic between the first network security device and a second network security device,
      creating a second policy to divert a second portion of the network traffic to the second network security device selected by the pre-filtering of the network traffic based on the network traffic-related characteristics of the packets that match capabilities of the second network security device, the capabilities of the second network security device being different from the capabilities of the first network security device, and
      transmitting the first policy and the second policy to the network switch effectuating the pre-filtering of the traffic.

2. The computing system of claim 1, wherein the controller is to monitor a workload of each network security device of the plurality of network security devices and to create a policy that determines a destination of the network traffic or a portion thereof based on the workload.

3. The computing system of claim 1, wherein the first policy instructs the network switch to determine an order in which the first and second network securities devices will process the traffic.

4. The computing system of claim 1, wherein the controller is to create a policy that instructs the network switch to direct the network traffic to multiple network security devices of the plurality of network security devices.

5. A method for directing network traffic, comprising:
   receiving network traffic in a switch;
   receiving, in the switch, instructions from a controller including a first policy to direct a first portion of the network traffic to a first network security device of a pool of network security devices, the first network security device configured to receive packets or portions thereof directed to the first network security device by the switch, for packet inspection, wherein the first network security device is selected by pre-filtering the network traffic based on network traffic-related characteristics of the packets matching capabilities of the first network security device and on capabilities, and wherein each network security device is a device that scans packets to detect malicious activity in network traffic, wherein the controller is to monitor differing capabilities of each network security device of the pool of network security devices and to create at least one policy that determines a destination of the network traffic or a portion thereof based on the differing capabilities, wherein first policy instructs the switch to split the first portion of the network traffic between the first network security device and a second network security device;

receiving, in the switch, instructions from the controller including a second policy to direct a second portion of the network traffic to the second network security device of the pool of network security devices, the second network security device configured to receive packets or portions thereof directed to the second network security device by the switch, for packet inspection, wherein the second network security device is selected by the pre-filtering of the network traffic based on the network traffic-related characteristics of the packets that match capabilities and workload of the second network security device, the capabilities of the second network security device being different from the capabilities of the first network security device; and diverting the portion of the network traffic to at least one of the first or second network security devices of the pool of network security devices according to the first or the second policy received from the controller.

6. The method of claim 5, further comprising pre-filtering, in the switch, the first portion of the network traffic to be sent to the first network security device to identify malicious content, suspicious network traffic to be sent to the first network security device.

7. The method of claim 5, wherein the network traffic is received in multiple switches, and wherein the network traffic is directed to the pool of network security devices to balance workload of the network traffic across the network security devices.

8. The method of claim 5, further comprising selecting a network security device from the pool of network security devices by matching workload and capabilities of the network security device to optimize scanning of the network traffic.

9. A tangible, non-transitory, computer-readable medium comprising instructions that direct a controller to:
monitor network traffic in a network switch;
select a first network security device from a plurality of network security devices, the first network security device configurable to receive packets or portions thereof directed to the first network security device by the network switch, to receive a first portion of the network traffic for scanning based on network traffic-related characteristics of the packets making up the network traffic that match capabilities and workload of the first network security device and on capabilities, wherein the first policy instructs the network switch to split the first portion of the network traffic between the first network security device and a second network security device;
select the second network security device from the plurality of network security devices, the second network security device configurable to receive packets or portions thereof directed to the second network security device by the network switch, to receive a second portion of the network traffic for scanning based on network traffic-related characteristics of the packets making up the network traffic that match capabilities and workload of the second network security device and on capabilities the capabilities of the second network security device being different from the capabilities of the first network security device;
monitor differing capabilities of the first network security device and the second network security device;
generate one or more policies to instruct the network switch in directing the network traffic or a portion thereof to the first network security device and second network security device based on the differing capabilities; and
transmit the one or more policies to a network switch.

10. The tangible, non-transitory, computer-readable medium of claim 9, wherein the controller is to transmit the policy to the switch to instruct the switch to direct the network traffic to the at least one of the first or second network security devices.

11. The tangible, non-transitory, computer-readable medium of claim 9, wherein a predetermined portion of the network traffic is to be directed to the first or second network security device and wherein the portion of network traffic is to be identified based on a policy created by the controller.

12. The tangible, non-transitory, computer-readable medium of claim 9, wherein the controller is to select a network security device by matching workload of the first or the second network security device to optimize scanning of the network traffic.

13. The tangible, non-transitory, computer-readable medium of claim 9, wherein each network security device scans network data to determine if malware is present in the network traffic.

14. The computing system of claim 1, wherein each network security device scans network data to determine if malware is present in the network traffic.

15. The method of claim 5, wherein each network security device scans network data to determine if malware is present in the network traffic.

* * * * *